(12) United States Patent
Reddy et al.

(10) Patent No.: US 12,639,357 B2
(45) Date of Patent: May 26, 2026

(54) DYNAMIC CONVERSATION INSIGHTS USING LARGE LANGUAGE MODELS

(71) Applicant: SAP SE, Walldorf (DE)

(72) Inventors: Srinivasa Byaiah Ramachandra Reddy, Bangalore (IN); Justin Mathew, New Delhi (IN)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 18/663,734

(22) Filed: May 14, 2024

(65) Prior Publication Data

US 2025/0355918 A1    Nov. 20, 2025

(51) Int. Cl.
*G06F 16/34* (2025.01)
*G06F 16/35* (2025.01)
*G06F 40/58* (2020.01)

(52) U.S. Cl.
CPC ............ *G06F 16/345* (2019.01); *G06F 16/35* (2019.01); *G06F 40/58* (2020.01)

(58) Field of Classification Search
CPC ......... G06F 16/345; G06F 16/35; G06F 40/58
See application file for complete search history.

(56) References Cited

U.S. PATENT DOCUMENTS

| | | | | |
|---|---|---|---|---|
| 12,008,332 | B1 * | 6/2024 | Gardner .................. | G06F 40/56 |
| 2020/0125678 | A1 * | 4/2020 | Conley ............... | G06N 3/0442 |
| 2021/0275911 | A1 * | 9/2021 | Padmanabhan ......... | G06F 16/35 |
| 2023/0028408 | A1 * | 1/2023 | De .......................... | H04L 51/02 |
| 2024/0248711 | A1 * | 7/2024 | Ziolkowski ............... | G06F 8/73 |
| 2024/0249318 | A1 * | 7/2024 | Spiegel ............. | G06Q 30/0269 |
| 2024/0256784 | A1 * | 8/2024 | Harris ..................... | G06F 40/35 |
| 2024/0267344 | A1 * | 8/2024 | Mulligan ............... | H04L 51/02 |
| 2024/0281891 | A1 * | 8/2024 | Fields .................... | G06Q 40/08 |
| 2024/0289103 | A1 * | 8/2024 | Cooper .................. | G06F 8/433 |
| 2024/0291777 | A1 * | 8/2024 | Fields .................... | H04L 51/02 |
| 2024/0403596 | A1 * | 12/2024 | Brannan ................. | G06F 40/35 |
| 2024/0414108 | A1 * | 12/2024 | Sun ......................... | H04L 51/02 |
| 2025/0063029 | A1 * | 2/2025 | Wen ......................... | G06F 21/31 |
| 2025/0217400 | A1 * | 7/2025 | Mansfield ............. | G06F 16/338 |
| 2025/0284963 | A1 * | 9/2025 | Abhyankar ............ | G06N 20/00 |

* cited by examiner

*Primary Examiner* — Kevin Ky

(74) *Attorney, Agent, or Firm* — SCHWEGMAN LUNDBERG & WOESSNER, P.A.

(57) ABSTRACT

In an example embodiment, several different fine-tuned LLMs are utilized to provide a system where an administrator can request conversational log insights using natural language and be presented with insights generated by an LLM, without necessitating the passing of any personal or sensitive data to a third-party. Furthermore, the use of several fine-tuned LLMs reduces the number of input tokens needing to be submitted to any one particular LLM, overcoming a key technical limitation of LLMs.

20 Claims, 6 Drawing Sheets

200

AMBIGUITY

LOW

87%

7% HIGH

7%

MEDIUM

202

CLARITY

UNCLEAR

27%

73%

CLEAR

204

INTENTION

REPORT PAYMENT ISSUE

HELP SOLVE PAYMENT ISSUE

SUBMIT REVIEW

SUBMIT FEEDBACK

CHECK REFUND STATUS

7%
7%
7%
13%
20%
27% FIND INVOICE
7% CONSIDER ORDER
13%
GET ORDER CANCELLATION

206

EMOTIONS

CURIOSITY

27%

CONFUSION

20%

7% INDECISION

REQUEST

27%

13%

7%

7% CONSIDERATION

INQUIRY

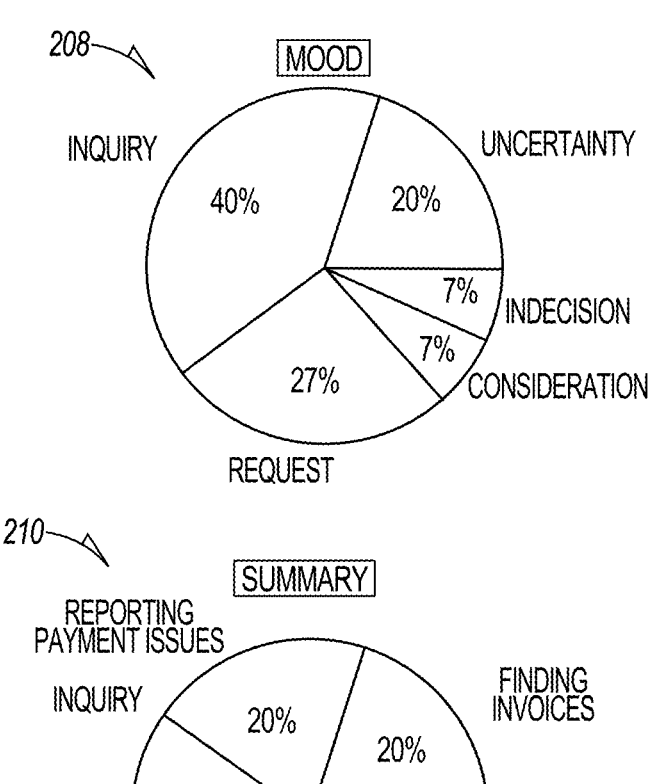
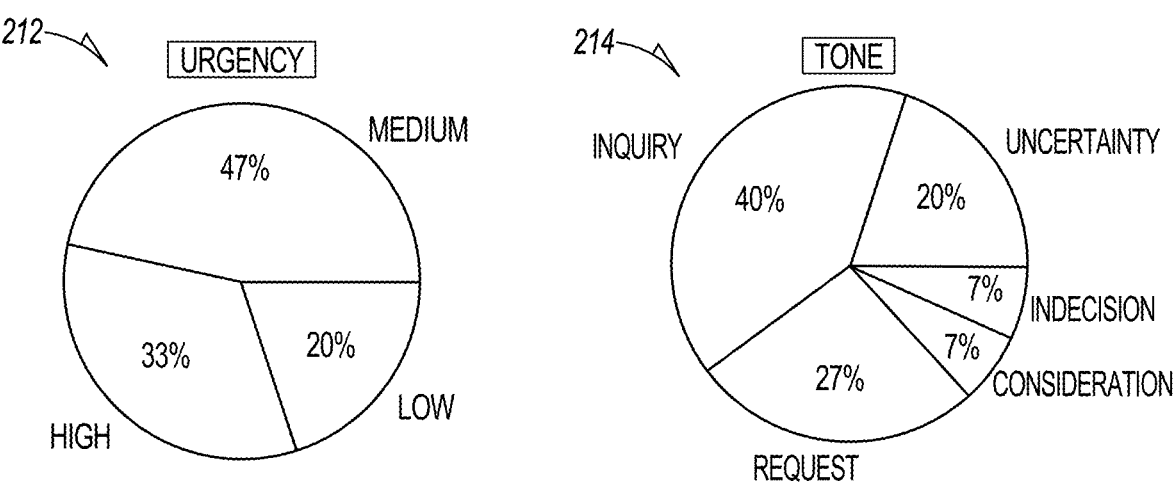
*FIG. 2B*

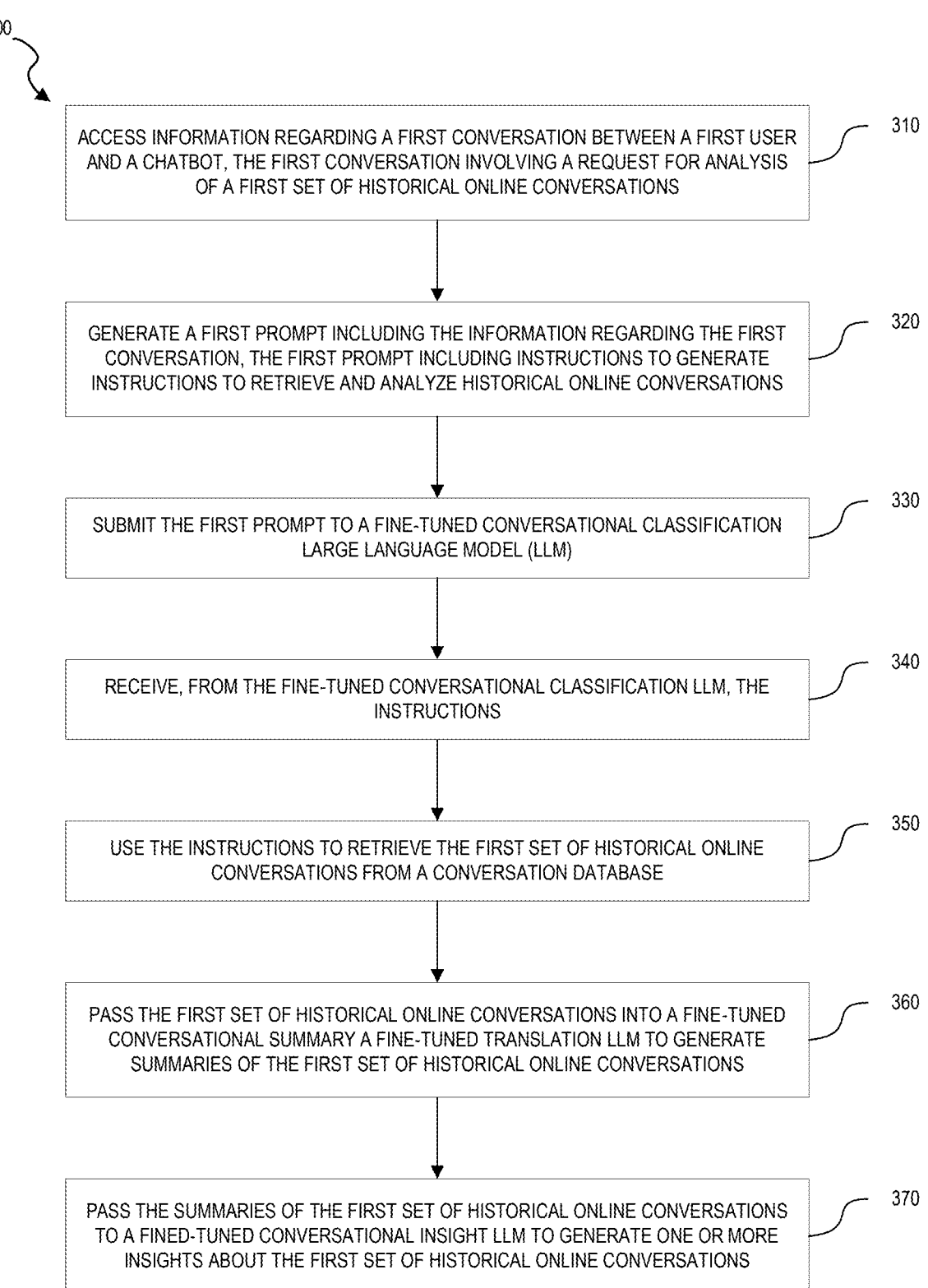

300

ACCESS INFORMATION REGARDING A FIRST CONVERSATION BETWEEN A FIRST USER
AND A CHATBOT, THE FIRST CONVERSATION INVOLVING A REQUEST FOR ANALYSIS
OF A FIRST SET OF HISTORICAL ONLINE CONVERSATIONS                          310

GENERATE A FIRST PROMPT INCLUDING THE INFORMATION REGARDING THE FIRST
CONVERSATION, THE FIRST PROMPT INCLUDING INSTRUCTIONS TO GENERATE
INSTRUCTIONS TO RETRIEVE AND ANALYZE HISTORICAL ONLINE CONVERSATIONS       320

SUBMIT THE FIRST PROMPT TO A FINE-TUNED CONVERSATIONAL CLASSIFICATION
LARGE LANGUAGE MODEL (LLM)                                                 330

RECEIVE, FROM THE FINE-TUNED CONVERSATIONAL CLASSIFICATION LLM, THE
INSTRUCTIONS                                                              340

USE THE INSTRUCTIONS TO RETRIEVE THE FIRST SET OF HISTORICAL ONLINE
CONVERSATIONS FROM A CONVERSATION DATABASE                                 350

PASS THE FIRST SET OF HISTORICAL ONLINE CONVERSATIONS INTO A FINE-TUNED
CONVERSATIONAL SUMMARY A FINE-TUNED TRANSLATION LLM TO GENERATE
SUMMARIES OF THE FIRST SET OF HISTORICAL ONLINE CONVERSATIONS              360

PASS THE SUMMARIES OF THE FIRST SET OF HISTORICAL ONLINE CONVERSATIONS
TO A FINED-TUNED CONVERSATIONAL INSIGHT LLM TO GENERATE ONE OR MORE
INSIGHTS ABOUT THE FIRST SET OF HISTORICAL ONLINE CONVERSATIONS           370

*FIG. 3*

DYNAMIC CONVERSATION INSIGHTS USING LARGE LANGUAGE MODELS

TECHNICAL FIELD

This document generally relates to computer systems. More specifically, this document relates to use of large language models (LLMs) for dynamic conversation insights.

BACKGROUND

Enterprise Resource Planning (ERP) software integrates into a single system various processes used to run an organization, such as finance, manufacturing, human resources, supply chain, services, procurement, and others. These processes typically provide intelligence, visibility, and efficiency across most if, not all, aspects of an organization. One example of ERP software is SAP® S/4 HANA from SAP SE of Walldorf, Germany.

A LLM refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

FIGS. 2A and 2B are diagrams illustrating example charts that may be generated by the fine-tuned conversational insights LLM, in accordance with an example embodiment.

FIG. 3 is a flowchart of an example method for generating insights of historical online conversations using fine-tuned LLMs, in accordance with an example embodiment.

DETAILED DESCRIPTION

Figure 1:
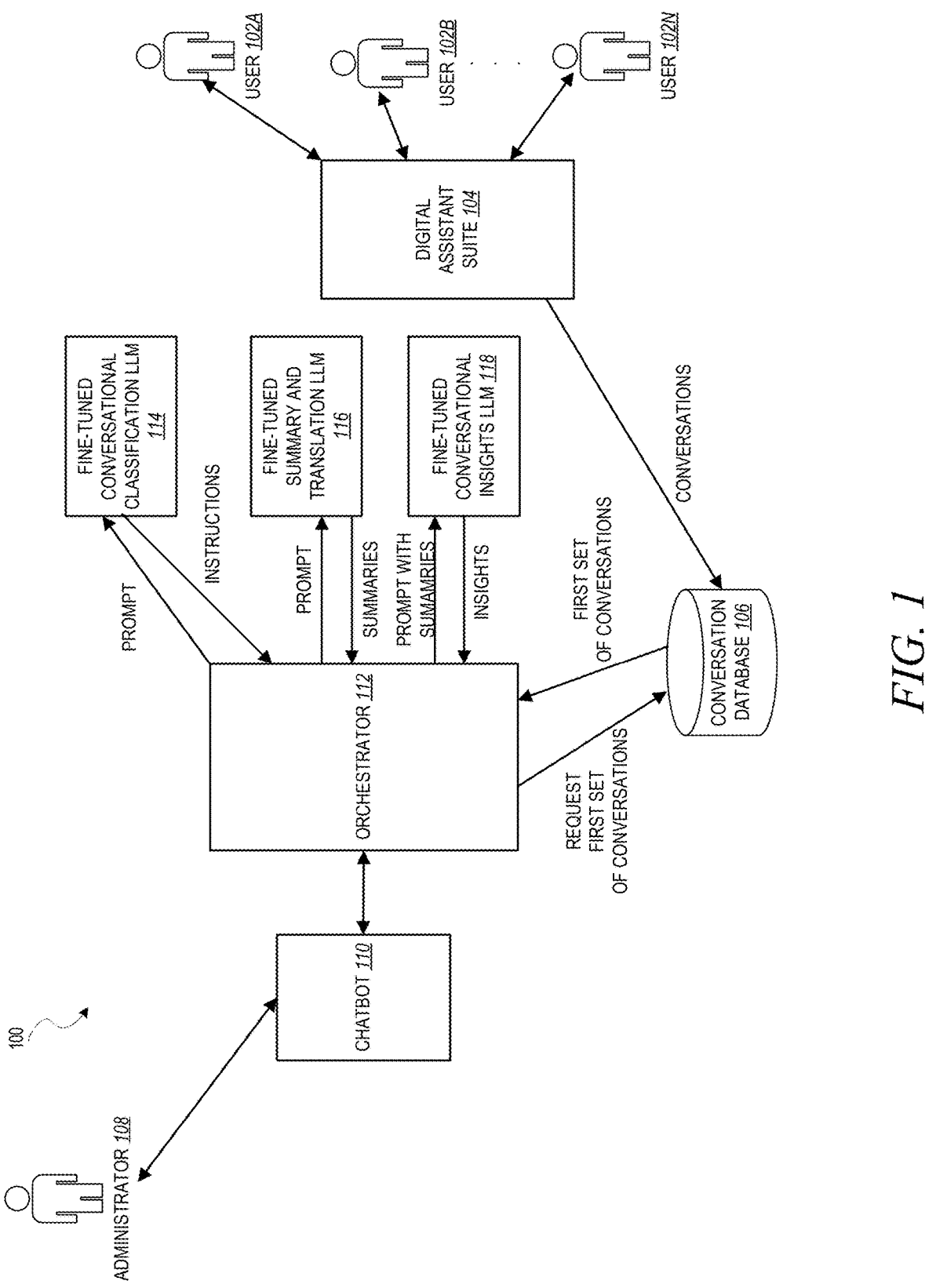
FIG. 1 is a block diagram illustrating a system for using machine learning to generate insights about online conversations in an online network, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

ERPs may support a variety of enterprise workflows including, for example, billing, invoicing, procurement, payroll, time and attendance management, recruiting and onboarding, learning and development, performance and compensation, workforce planning, and/or the like. In some cases, user interactions with an enterprise software application may be conducted via a conversation simulation application (e.g., a chatbot and/or the like).

Accordingly, one or more data processing functionalities of the enterprise software application may be invoked using natural language commands. In some cases, instead of being a text input, the natural language commands may be voice commands received via a voice-based user interface. For example, the conversation simulation application may receive a natural language command invoking an enterprise workflow associated with an enterprise software application, such as assigning a source of supply within an ERP application, that requires performing a sequence of operations. Alternatively and/or additionally, an ERP system may include an issue tracking system configured to generate a ticket in response to an error reported via one or more telephone calls, emails, short messaging service (SMS) messages, social media posts, web chats, and/or the like.

Analyzing ongoing conversations with end users can help improve/retrain/upgrade a digital assistant that is used for responses. This analysis can uncover various insights into user conversations, such as purposes, sentiments, entities, and intents mentioned.

One solution would be to obtain all conversation logs and analyze them as a whole, using machine learning. This approach, however, has several technical drawbacks. Firstly, many machine learning models trained to perform analysis for insights have difficulty processing human language. LLMs, on the other hand, are trained specifically to handle the intricacies of human language, but there are still technical limitations with their use that can limit their ability to handle capability information. Specifically, as the number of possible matching capabilities rises, the input length of the input to an LLM becomes unwieldy. LLMs are caused to generate content, such as text, using a prompt. The prompt instructs the LLM as to how to generate the content and also provides context in the form of input tokens to improve the reliability of how the LLM generates that content. Many LLMs, however, have a limit on the amount of input tokens they allow. Even those that do not have a limit can have issues as the number of tokens grow, specifically because the computation time in such scenarios grows exponentially and the computation time can grow so great that results can no longer be generated in an acceptable time for most users, especially considering users are expecting real-time or near-real-time recommendations on capabilities in response to their queries.

Secondly, in some cases, the conversational data includes personal or otherwise sensitive data. Users may not wish this personal or sensitive data to be shared with a third party, such as a third party running an LLM or even an administrator viewing the insights.

One additional issue is that there may be an administrator who requests the conversational insights and then wishes to see the results. The administrator's intent, however, in requesting the insights may not always be clear, which can result in the administrator being presented with insight types that do not match what the administrator desired to see. Thus, there is a conversation happening with the administrator who is requesting insights on other conversations (ones that do not involve the administrator).

In an example embodiment, several different fine-tuned LLMs are utilized to provide a system where an administrator can request conversational log insights using natural language and be presented with insights generated by an LLM, without necessitating the passing of any personal or sensitive data to a third party. Furthermore, the use of several fine-tuned LLMs reduces the number of input tokens needing to be submitted to any one particular LLM, overcoming a key technical limitation of LLMs.

More particularly, a chat-based solution is provided, where an administrator may interact with a chatbot that uses a specialized fine-tuned conversational classification LLM to generate instructions to a separately fine-tuned conversational summary and translation LLM. These instructions are generated based on an intent of the administrator as determined by the administrator's interactions (e.g., natural language input) with the chatbot. The instructions cause the conversational summary and translation LLM to access certain conversations from conversation logs in a conversation database.

The conversational summary and translation LLM normalizes the conversations (which may include translating the conversations to a common language) and summarizes the conversations. The summaries may then be passed to a separately fine-tuned conversational insight LLM that generates one or more insights that can be returned to the administrator.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modeling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. A GAN is a supervised machine learning model that has two sub-models: a generator model that is trained to generate new examples and a discriminator model that tries to classify examples as either real or generated. The two models are trained together in an adversarial manner (using a zero-sum game according to game theory) until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round and, importantly, the generator is updated based on how well generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with an LLM will be described.

FIG. 1 is a block diagram illustrating a system 100 for using machine learning to generate insights about online conversations in an online network, in accordance with an example embodiment. Here, conversations occurring on the online network, such as via interaction between users 102A, 102B, . . . , 102N, and a digital assistant suite 104 may be captured in conversation logs and stored in a conversation database 106. An administrator 108 may then interact with a chatbot 110 to request conversational insights. The chatbot 110 supports a context or scope to request and receive insights into conversations using a natural language query that may include purposes, skills, intents, and/or keywords, etc. An orchestrator 112 then generates a prompt including the natural language query to a fine-tuned conversational classification LLM 114.

In an example embodiment, the fine-tuned conversational classification LLM 114 is an encoder-only autoencoding model such as BERT or a Robustly Optimized BERT Pretraining Approach (ROBERTa) model. ROBERTa revises several key hyperparameters in BERT's pretraining process, including the removal of the Next Sentence Prediction (NSP) objective, training with much larger mini-batches and learning rates, and using more data for training. It also trains the model for more iterations, contributing to its improved performance. Moreover, ROBERTa explores dynamic masking, where the masking pattern is changed dynamically at each epoch, as opposed to BERT's static masking, where the masking pattern is determined before training starts and remains constant.

The fine-tuned conversational classification LLM 114 then returns a set of instructions indicating which conversational logs to retrieve and what insights should be generated. This set of instructions is then added to a prompt by the orchestrator 112 that is then sent to the fine-tuned conversational summary and translation LLM 116, which then retrieves the corresponding conversational logs and normalizes them. This normalization involves transforming the conversations in the conversation log into a common language but also can involve other normalization techniques, such as case normalization, punctuation removal, stop word removal, stemming, lemmatization, tokenization, replacing synonyms, removing numbers and symbols, and/or removing any non-textual elements.

The fine-tuned conversational summary and translation LLM 116 then summarizes each conversation. These summaries may then be returned to the orchestrator 112, which then generates a prompt including the summaries. This prompt requests that a fine-tuned conversational insights LLM 118 generate one or more insights regarding the conversational log. This prompt may include, or at least reference, a portion of the set of instructions generated by the fine-tuned conversational classification LLM 114.

In an example embodiment, the fine-tuned conversational insights LLM 118 is a decoder-only autoregressive model such as GPT or Bloom.

It should be noted that while this example describes a scenario where the orchestrator receives a natural language request from the administrator that includes both an indication of both the scope of the conversational logs to analyze (e.g., which logs to analyze) and the intent, goal, and/or purpose of the analysis in one request, and then the fine-tuned conversational classification LLM 114 processes this in response to a single prompt, in other example embodiments this information may arrive in separate requests that are processed separately. Thus, for example, the administrator may provide a first request where they indicate the conversational logs to analyze, and that first request may be included in a first prompt to the fine-tuned conversational classification LLM 114 to generate instructions to retrieve the correct conversational logs. Then the administrator can provide a second request where they indicate the insights they wish to get about the conversational logs. This second request may then be included in a second prompt the fine-tuned conversational classification LLM 114 to generate instructions to analyze the conversational logs that have been retrieved.

It should also be noted that while in some example embodiments, the fine-tuned conversational insights LLM 118 may generate graphical output in addition to, or even in lieu of, text-based output. More specifically, embodiments are foreseen where the fine-tuned conversational insights LLM 118 generates charts based on metrics computed by the fine-tuned conversational insights LLM 118 on the summaries of the conversation logs.

Additionally, as can be seen, in some example embodiments the only component that actually sees the contents of the conversational logs themselves is the fine-tuned conversational summary and translation LLM 116. The actual contents of the conversational logs are never disclosed to the administrator 108, the fine-tuned conversational classification LLM 114, or the fine-tuned conversational insights LLM 118.

As an example, assume an administrator enters the following query into the chatbot 102:

Query: "Load all the conversations with the intentions to create, update or delete sales orders"

This query is then added to a prompt to request that the fine-tuned conversational classification LLM 114 generate instructions. The response from the fine-tuned conversational classification LLM 114 can be instructions as follows:

You need to search all the conversations, classify or identify the intention for every conversation and filter the conversations that has intention to perform CRUD operations on sales order. Further generate visual charts for static conversational Insights.

At least some of these instructions are then included in a prompt to the fine-tuned conversational summary and translation LLM 116. For example, the instructions "You need to search all the conversations, classify or identify the intention for every conversation and filter the conversations that has intention to perform CRUD operations on sales order." can be included in such a prompt and in response the fine-tuned conversational summary and translation LLM 116 retrieves the correct conversational logs (in this case all conversational logs involving sales orders), and summarizes them, then filters them to be left with only conversations that have intentions to perform CRUD operations on a sales order. The output would then be a summary of all of the conversations that have intentions to perform CRUD operations on the sales order.

Other examples of instructions may be as follows:

```
//derived from capability metadata or description
"instruction": "when the user action is related to Human Resources, payroll, talent
management, HR analytics and workforce planning, and employee experience
management"
"input": "",
"output": "User intention is related to capability name: sfsf_das_capability
```

```
capability namespace: com.sap.sfsf.dev capability version: 1.0.0
//derived from intents
"instruction": "view my payslip for the month"
"input": "March",
"output": "User intention is to view the pay statement for March from capability
name: sfsf_das_capability capability namespace: com.sap.sfsf.dev capability
version: 1.0.0
"instruction": "show my recent payslip"
"input": "",
"output": "User intention is to view the recent pay statement from capability name:
sfsf_das_capability capability namespace: com.sap.sfsf.dev capability version:
1.0.0
"instruction": "provide feedback to"
"input": "Anna",
"output": "User intention is to give feedback to an employee from capability name:
sfsf_das_capability capability namespace: com.sap.sfsf.dev capability version:
1.0.0
"instruction": "update my legal name to "
"input": "Leo",
"output": "User intention is to update his legal name from capability name:
sfsf_das_capability capability namespace: com.sap.sfsf.dev capability version:
1.0.0
// derived from dialog function or code
"instruction": "view my personal info"
"input": "",
"output": "User intention is to get his personal information from capability name:
sfsf_das_capability capability namespace: com.sap.sfsf.dev capability version:
1.0.0
```

This summary is then included in a prompt to the fine-tuned conversational insights LLM 118 along with a portion of the instructions. For example, the instructions "Further generate visual charts for static conversational Insights" can be included in such a prompt and in response the fine-tuned conversational insights LLM 118 generates one or more charts. Other example prompt instructions could include:

Conversations: [% s, % s, . . . , @s] Given an given array of conversations, determine the purpose as metric types only in the format purpose: ('% s', '% s', '% s')"

Conversations: [% s, % s, . . . , @s] Given an given array of conversations, determine the {% s} expressed only in the format: [{'metric': '% s'}]." % purpose: (find invoice, cancellation, status, payment issue)

Figure 2A:
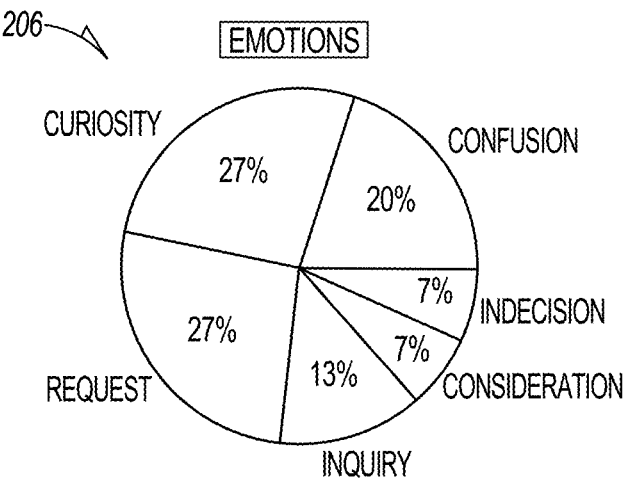

FIGS. 2A and 2B are diagrams illustrating example charts that may be generated by the fine-tuned conversational insights LLM 118, in accordance with an example embodiment. The depicted charts are all pie charts, although one of ordinary skill in the art will recognize that other types of charts may be generated in addition to, or in lieu of, pie charts. Referring first to FIG. 2A, an ambiguity chart 200 indicates which percentage of all conversations had low, medium, or high ambiguity in them. A clarity chart 202 indicates which percentage of conversations were either clear or unclear. An intention chart 204 indicates which percentage of conversations had which types of intentions expressed within them. An emotions chart 206 indicates which percentage of conversations had which types of emotions expressed within them.

Referring to FIG. 2B, a mood chart 208 indicates which percentage of conversations had which types of moods expressed within them. A summary chart 210 indicates which percentage of conversations had which types of summaries expressed within them. An urgency chart 212 indicates which percentage of conversations had what level of urgency expressed within them. A tone chart 214 indicates which percentage of conversations had which types of tones expressed within them.

FIG. 3 is a flowchart of an example method 300 for generating insights of historical online conversations using fine-tuned LLMs, in accordance with an example embodiment.

At step 310, information regarding a first conversation between a first user and a chatbot is accessed. The first conversation involves a request for analysis of a first set of historical online conversations.

At step 320, a first prompt comprising the information regarding the first conversation is generated. The first prompt comprises instructions to generate instructions to retrieve and analyze historical online conversations.

At step 330, the first prompt is submitted to a fine-tuned conversational classification LLM. At step 340, the instructions are received from the fine-tuned conversational classification LLM. At step 350, the instructions are used to retrieve the first set of historical online conversations from a conversation database.

At step 360, the first set of historical online conversations is passed into a fine-tuned conversational summary and translation LLM to generate summaries of the first set of historical online conversations. At step 370, the summaries of the first set of historical online conversations are passed to a fined-tuned conversational insight LLM to generate one or more insights about the first set of historical online conversations.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing information regarding a first conversation between a first user and a chatbot, the first conversation involving a request for analysis of a first set of historical online conversations; generating a first prompt comprising the information regarding the first conversation, the first prompt further comprising instructions to generate instructions to retrieve and analyze historical online conversations; submitting the first prompt to a fine-tuned conversational classification Large Language Model (LLM); receiving, from the fine-tuned conversational classification LLM, the instructions; using the instructions to retrieve the first set of historical online conversations from a conversation database; passing the first set of historical online conversations into a fine-tuned conversational summary and translation LLM to generate summaries of the first set of historical online conversations; and passing the summaries of the first set of historical online conversations to a fined-tuned conversational insight LLM to generate one or more insights about the first set of historical online conversations.

In Example 2, the subject matter of Example 1 includes, wherein the first set of historical online conversations are between users and a first application in an online network.

In Example 3, the subject matter of Examples 1-2 includes, wherein the operations further comprise: normalizing the first set of historical online conversations.

In Example 4, the subject matter of Examples 1-3 includes, wherein the operations further comprise: translating the first set of historical online conversations.

In Example 5, the subject matter of Examples 1-4 includes, wherein the fine-tuned conversational insights LLM is fine-tuned to generate one or more metrics regarding intent of conversations in a set of historical online conversations and to generate one or more graphical charts based on the generated one or more metrics.

In Example 6, the subject matter of Examples 1-5 includes, wherein the first set of historical online conversations contain personal data that is not shared with the fined-tuned conversational insight LLM.

In Example 7, the subject matter of Examples 1-6 includes, wherein the first conversation is broken into a first part and a second part, the first part identifying the first set of historical online conversation and the second part identifying analysis to be performed, and wherein the first part and the second part are fed to the fine-tuned conversational classification LLM in separate prompts.

In Example 8, the subject matter of Examples 1-7 includes, wherein the insights include a summarization of aspects conveyed during conversations in the first set of historical online conversations.

In Example 9, the subject matter of Example 8 includes, wherein the insights include one or more graphical charts indicating which percentage of conversations in the first set of historical online conversations conveyed which aspects.

In Example 10, the subject matter of Example 9 includes, wherein the aspects include mood conveyed during conversations in the first set of historical online conversations.

In Example 11, the subject matter of Examples 9-10 includes, wherein the aspects include tone conveyed during conversations in the first set of historical online conversations.

Example 12 is a method comprising: accessing information regarding a first conversation between a first user and a chatbot, the first conversation involving a request for analysis of a first set of historical online conversations; generating a first prompt comprising the information regarding the first conversation, the first prompt comprising instructions to generate instructions to retrieve and analyze historical online conversations; submitting the first prompt to a fine-tuned conversational classification Large Language Model (LLM); receiving, from the fine-tuned conversational classification LLM, the instructions; using the instructions to retrieve the first set of historical online conversations from a conversation database; passing the first set of historical online conversations into a fine-tuned conversational summary and translation LLM to generate summaries of the first set of historical online conversations; and passing the summaries of the first set of historical online conversations to a fined-tuned conversational insight LLM to generate one or more insights about the first set of historical online conversations.

In Example 13, the subject matter of Example 12 includes, wherein the first set of historical online conversations are between users and a first application in an online network.

In Example 14, the subject matter of Examples 12-13 includes, normalizing the first set of historical online conversations.

In Example 15, the subject matter of Examples 12-14 includes, translating the first set of historical online conversations.

In Example 16, the subject matter of Examples 12-15 includes, wherein the fine-tuned conversational insights LLM is fine-tuned to generate one or more metrics regarding intent of conversations in a set of historical online conversations and to generate one or more graphical charts based on the generated one or more metrics.

In Example 17, the subject matter of Examples 12-16 includes, wherein the first set of historical online conversations contain personal data that is not shared with the fined-tuned conversational insight LLM.

Example 18 is a non-transitory machine-readable medium storing instructions which, when executed by one or more processors, cause the one or more processors to perform operations comprising: accessing information regarding a first conversation between a first user and a chatbot, the first conversation involving a request for analysis of a first set of historical online conversations; generating a first prompt comprising the information regarding the first conversation, the first prompt comprising instructions to generate instructions to retrieve and analyze historical online conversations; submitting the first prompt to a fine-tuned conversational classification Large Language Model (LLM); receiving, from the fine-tuned conversational classification LLM, the instructions; using the instructions to retrieve the first set of historical online conversations from a conversation database; passing the first set of historical online conversations into a fine-tuned conversational summary and translation LLM to generate summaries of the first set of historical online conversations; and passing the summaries of the first set of historical online conversations to a fined-tuned conversational insight LLM to generate one or more insights about the first set of historical online conversations.

In Example 19, the subject matter of Example 18 includes, wherein the first set of historical online conversations are between users and a first application in an online network.

In Example 20, the subject matter of Examples 18-19 includes, wherein the operations further comprise: normalizing the first set of historical online conversations.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
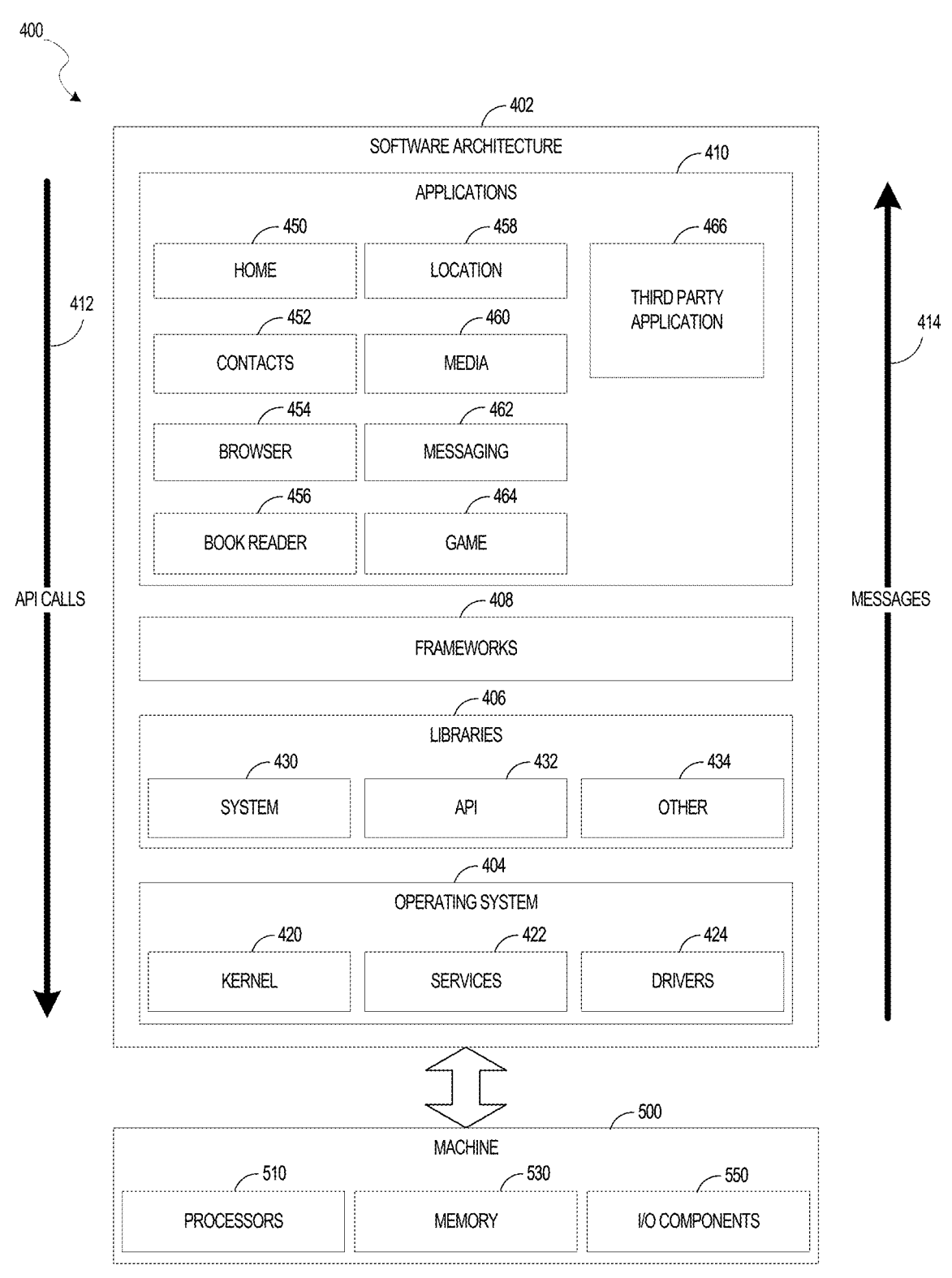
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various graphical user interface functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
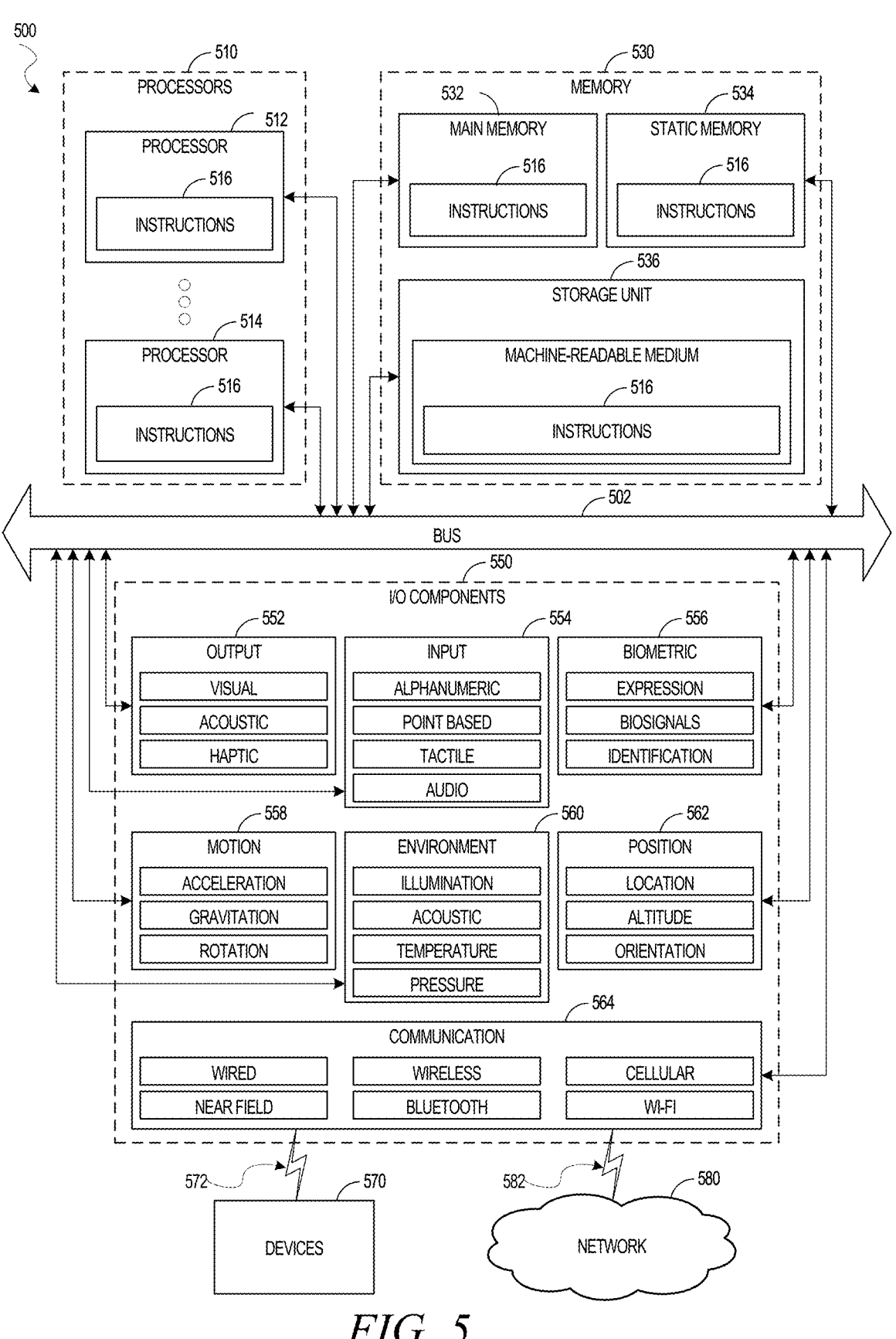
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

accessing information regarding a first conversation between a first user and a chatbot, the first conversation involving a request for analysis of a first set of historical online conversations;

generating a first prompt comprising the information regarding the first conversation, the first prompt further comprising instructions to generate instructions to retrieve and analyze historical online conversations;

submitting the first prompt to a fine-tuned conversational classification Large Language Model (LLM);

receiving, at an orchestrator, from the fine-tuned conversational classification LLM, the instructions;

retrieving, using the instructions from the fine-tuned conversational classification LLM, by the orchestrator, the first set of historical online conversations from a conversation database;

passing, by the orchestrator, the first set of historical online conversations into a fine-tuned conversational summary and translation LLM to generate summaries of the first set of historical online conversations; and passing, by the orchestrator, the summaries of the first set of historical online conversations to a fined-tuned conversational insight LLM to generate one or more insights about the first set of historical online conversations.

2. The system of claim 1, wherein the first set of historical online conversations are between users and a first application in an online network.

3. The system of claim 1, wherein the operations further comprise:

normalizing the first set of historical online conversations.

4. The system of claim 1, wherein the operations further comprise:

translating the first set of historical online conversations.

5. The system of claim 1, wherein the fine-tuned conversational insights LLM is fine-tuned to generate one or more metrics regarding intent of conversations in a set of historical online conversations and to generate one or more graphical charts based on the generated one or more metrics.

6. The system of claim 1, wherein the first set of historical online conversations contain personal data that is not shared with the fined-tuned conversational insight LLM.

7. The system of claim 1, wherein the first conversation is broken into a first part and a second part, the first part identifying the first set of historical online conversation and the second part identifying analysis to be performed, and wherein the first part and the second part are fed to the fine-tuned conversational classification LLM in separate prompts.

8. The system of claim 1, wherein the insights include a summarization of aspects conveyed during conversations in the first set of historical online conversations.

9. The system of claim 8, wherein the insights include one or more graphical charts indicating which percentage of conversations in the first set of historical online conversations conveyed which aspects.

10. The system of claim 9, wherein the aspects include mood conveyed during conversations in the first set of historical online conversations.

11. The system of claim 9, wherein the aspects include tone conveyed during conversations in the first set of historical online conversations.

12. A method comprising:

accessing information regarding a first conversation between a first user and a chatbot, the first conversation involving a request for analysis of a first set of historical online conversations;

generating a first prompt comprising the information regarding the first conversation, the first prompt further comprising instructions to generate instructions to retrieve and analyze historical online conversations;

submitting the first prompt to a fine-tuned conversational classification Large Language Model (LLM);

receiving, at an orchestrator, from the fine-tuned conversational classification LLM, the instructions;

retrieving, using the instructions from the fine-tuned conversational classification LLM, by the orchestrator, the first set of historical online conversations from a conversation database;

passing, by the orchestrator, the first set of historical online conversations into a fine-tuned conversational summary and translation LLM to generate summaries of the first set of historical online conversations; and passing, by the orchestrator, the summaries of the first set of historical online conversations to a fined-tuned conversational insight LLM to generate one or more insights about the first set of historical online conversations.

13. The method of claim 12, wherein the first set of historical online conversations are between users and a first application in an online network.

14. The method of claim 12, further comprising:

normalizing the first set of historical online conversations.

15. The method of claim 12, further comprising:

translating the first set of historical online conversations.

16. The method of claim 12, wherein the fine-tuned conversational insights LLM is fine-tuned to generate one or more metrics regarding intent of conversations in a set of historical online conversations and to generate one or more graphical charts based on the generated one or more metrics.

17. The method of claim 12, wherein the first set of historical online conversations contain personal data that is not shared with the fined-tuned conversational insight LLM.

18. A non-transitory machine-readable medium storing instructions which, when executed by one or more processors, cause the one or more processors to perform operations comprising:

accessing information regarding a first conversation between a first user and a chatbot, the first conversation involving a request for analysis of a first set of historical online conversations;

generating a first prompt comprising the information regarding the first conversation, the first prompt further comprising instructions to generate instructions to retrieve and analyze historical online conversations;

submitting the first prompt to a fine-tuned conversational classification Large Language Model (LLM);

receiving, at an orchestrator, from the fine-tuned conversational classification LLM, the instructions;

retrieving, using the instructions from the fine-tuned conversational classification LLM, by the orchestrator, the first set of historical online conversations from a conversation database;

passing, by the orchestrator, the first set of historical online conversations into a fine-tuned conversational summary and translation LLM to generate summaries of the first set of historical online conversations; and passing, by the orchestrator, the summaries of the first set of historical online conversations to a fined-tuned conversational insight LLM to generate one or more insights about the first set of historical online conversations.

19. The non-transitory machine-readable medium of claim 18, wherein the first set of historical online conversations are between users and a first application in an online network.

20. The non-transitory machine-readable medium of claim 18, wherein the operations further comprise:

normalizing the first set of historical online conversations.

* * * * *